United States Patent [19]

Tomosy

[11] Patent Number: 5,066,164
[45] Date of Patent: Nov. 19, 1991

[54] SPILL CONTAINMENT DEVICE FOR A SHIP

[76] Inventor: Geza Tomosy, 3900 Fish Hatchery Rd., Allentown, Pa. 18103

[21] Appl. No.: 630,884

[22] Filed: Dec. 20, 1990

[51] Int. Cl.$^5$ .............................................. E02B 15/06
[52] U.S. Cl. ..................................... 405/66; 210/923; 405/63
[58] Field of Search ....................... 405/60, 63, 64, 65, 405/66, 68, 70, 72; 210/923

[56] References Cited

U.S. PATENT DOCUMENTS

| 3,599,434 | 8/1971 | Missud | 405/68 X |
| 4,249,834 | 2/1981 | Bouvier | 405/70 |
| 4,282,822 | 8/1981 | Jackson | 405/68 X |

FOREIGN PATENT DOCUMENTS

01580  8/1980  PCT Int'l Appl. ................... 405/66

Primary Examiner—David H. Corbin
Attorney, Agent, or Firm—Eckert Seamans Cherin & Mellott

[57] ABSTRACT

A spill containment device for a ship such as an oil tanker includes a pouch which is mounted on the outer, uppermost hull section. The pouch completely encircles the hull. A flexible fluid-impervious skirt is affixed along one edge to the interior of the pouch. The skirt is folded and stored within the pouch, which is held shut by a releasable closure device such as a zipper. When activated, the pouch is caused to fully open about its bottom by a deployment mechanism enabling the skirt to drop and depend down from the hull into the water. The skirt is preferably weighted about its bottom and provides an impervious barrier to the leaking contaminant, trapping the contaminant with its periphery. Rescue vessels can then pump the oil out from within the skirt into a removal vessel.

21 Claims, 5 Drawing Sheets

SPILL CONTAINMENT DEVICE FOR A SHIP

BACKGROUND OF THE INVENTION

1. Field of the Invention

This invention relates to a depending skirt for oil tankers and the like, wherein a barrier of liquid impervious material can be very rapidly deployed around a ship's hull to contain leaking or spilling liquid cargoes which are less dense than water (such as oil), preventing any substantial spread of the cargo into surrounding water.

2. Description of the Prior Art

Catastrophic spills of oil from oil tankers are evidence of the need for an effective oil containment device which can be carried directly on an oil tanker, barge, etc., for prompt deployment to contain a spillage of oil or other such pollutants. Petroleum products, for example, are normally less dense than water and when escaping from a ship will rise to the surface and spread outwardly from the ship, causing environmental damage. Floating barriers (i.e., oil booms) have been developed to define a perimeter along the surface, and can be effective in containing expanding oil slicks when they are available, when wave and weather conditions are calm, and when they are deployed quickly. The barriers keep the floating oil in a limited area where skimmers can collect the oil.

A problem is presented in how to deploy the floating barrier to contain the spill. As time passes after a spill (e.g., from a rupture in the hull of the ship), the spreading oil requires a larger and larger barrier to encompass its expanding perimeter. Whereas a tanker cannot be moved when a spill occurs (to avoid dispersing the spill) and in any event is unlikely to be sufficiently maneuverable, the oil boom is typically deployed from an auxiliary ship which manuevers around the perimeter of the spill while dispensing the barrier linearly into the water, e.g., from the deck of the auxiliary ship. The barriers can be carried on the tankers themselves. Even in that case any delay in deployment allows the spill to expand to a point where a larger barrier is needed, and a larger barrier of course takes even more time to deploy. A delay of crucial minutes, hours, or even days, allows the spillage to spread before the barriers are deployed and may allow the spill to expand to a point where the required barrier is so long as to be unpractical and/or ineffective. In cases where barriers are carried on the tankers themselves, they are typically stowed in inconvenient protected storage areas which are remote from the point of deployment and are neither easily nor quickly deployed. As a result of delay, a larger barrier is needed, leading to further delay, etc. Speed and ease of deployment are crucial in preventing what could have been a contained minor spill from becoming a major ecological disaster.

Attempts have been made to solve the containment problem by providing floatable booms and the like which are carried to the scene of the spill or which are carried in a storage area on the ship and deployed by hand from the ship while it is in the water. Preus U.S. Pat. No. 4,073,143 discloses a barrier for pollutants which comprises a separable series of end-to-end floatable boom segments. The boom segments are connected to the ship at only a few points, whereby the ship's hull defines part of the barrier to the oil, and are connected to each other in a variable pattern. In order to deploy the boom and also to benefit from the various possible configurations of the boom structure, the Preus structure is assembled at the time of deployment and attached to a ship only then.

Niemi U.S. Pat. No. 4,129,989 discloses a floating ballasted oil containment boom which comprises boom elements interconnected end-to-end by overlapping joints. There is no provision in Niemi for attaching the boom to a ship or for deploying the boom from the ship. However the ballast in the boom assists in keeping the barrier vertical, to thereby maximize the depth of containment.

Fuxelius U.S. Pat. No. 4,333,726 discloses a flotation barrier comprising a floating curtain and weights to maintain the curtain in a vertical position. The curtain is constructed of flammable paper for easy disposal. The Fuxelius curtain is to be deployed from a helicopter, suggesting that a large curtain may be needed to enclose a spill. The curtain is not intended to be attached to or deployable from a sea-going vessel.

The present containment apparatus is attached to a ship's hull for storage as well as deployment, and is arranged to be instantly deployable immediately adjacent the hull. Bouvier U.S. Pat. No. 4,249,834 discloses an oil spill containment boom for ships including a deployable skirt which surrounds the periphery of a ship. The device is arranged to be spaced from the ship's hull by radial rib members which extend between the hull and a plurality of curtain segments which attach at vertical stems. When assembled, a flotation collar is maintained at a constant distance from the ship to provide a containment space for spilled oil. The curtain or boom can be assembled and taken apart at will to provide a perimeter of the required length.

The Bouvier boom is carried on board and kept in protective storage. In a time of need, the boom must be assembled and deployed, which takes time and necessitates means to encompass an area much larger than the hull. Although Bouvier addresses one problem by having the containment device immediately available by storing it on the hull of the ship, the need for rapid deployment is not fully addressed. Since many spills take place close to shore, and since the dimensions of the containment device needed increase over time, a more rapid deployment would be advantageous to better confine the oil. The delay caused when a containment device is not immediately deployable, as well as the aggravation of the problems associated with containing the expanding spill which are caused by delay, may account for the spread of great quantities of pollutant into the surrounding water.

There is, therefore, a need for a rapidly deployable containment system which is carried at all times on a ship and which is simple to operate and deploy to provide a containment curtain residing close to the ship.

SUMMARY OF THE INVENTION

The spill containment apparatus of the invention is mounted directly on the hull of a ship in a manner permitting the depending edge of the containment curtain or skirt to be dropped into the water, immediately deploying the containment apparatus and confining spillage to the immediate vicinity of the ship. The spill containment apparatus includes a storage pouch having an interior and an exterior, mounted to the ship, preferably adjacent the outer uppermost hull section or gunwale. The pouch includes releasable closure means, and within the pouch a continuous flexible skirt is stored and attached at a first skirt edge to the interior of the pouch. The skirt has an opposing free skirt edge at a distance from the attached first edge defining a vertical span. The skirt completely encircles the hull, and is folded, rolled or similarly contained within the storage pouch when stowed. Deployment means are provided for releasing the closure means, thereby dropping the free skirt edge to deploy the skirt from within the storage pouch while the first skirt edge remains attached. The skirt surrounds the hull of the ship, thereby preventing spread into the surrounding water of any contaminant which is less dense than water.

In most spill cases, for example, only a small portion of the capacity of a tanker, barge, or the like is involved in a leak. Leaking oil rises towards the surface and spreads out in the confined space between the skirt and the hull of the tanker. A medium size tanker, e.g., carrying 15,000 tons of oil (approx. 500,000 cubic feet) and having a length of 500-600 feet, would have a circumference of about 1200 feet. Estimating that a 20 foot space develops between the skirt and the hull, 24,000 cubic feet of oil can be contained for every foot of oil depth. A 10 foot deep pool therefore can contain a spill of about half of the tanker's full cargo for an extended time until help arrived.

It is an object of this invention to provide an immediately deployable in-place containment device which prevents the spread of lighter than water liquid contaminants which are released from the bottom or hull of a ship.

It is another object of this invention to provide a spill containment device which is protectively stored at a location safe from simultaneous damage when the hull is damaged, and does not interfere with normal activities.

It is yet another object of this invention to provide a spill containment device which can be deployed all at once, for example by remote control.

It is yet another object of this invention to provide a spill containment device which requires no maintenance attention by the crew of a ship and which uses no storage or deck space.

It is a further object of this device to provide a spill containment device for an oil tanker, barge or the like.

These and other objects will be more readily ascertainable to one skilled in the art from a consideration of the following figures, description and exemplary embodiments, with the understanding that the drawings are illustrative only and that changes may be made in the specific construction illustrated and described within the scope of the invention claimed.

DETAILED DESCRIPTION OF THE PREFERRED EMBODIMENTS

The invention is a spill containing curtain or skirt which is affixable around the upper and outer circumference of the hull of a ship, such as an oil tanker. One edge can be dropped to reside below the surface of the water and the other edge remains fixed. The skirt is arranged in a storage pouch having releasable closure means, such as a zipper. The continuous flexible skirt depends from the upper and outer circumference of the hull when deployed, and is folded within the storage pouch when stowed. The fixed edge of the skirt is preferably attached within the pouch, and thereby to the hull. A deployment mechanism for releasing the edge to be dropped allows the skirt to deploy from the pouch, thereby encircling the ship and providing a barrier containing any released contaminants such as oil. The deployment mechanism can be operated via remote control for an all-at-once rapid deployment in an emergency.

Figure 1:
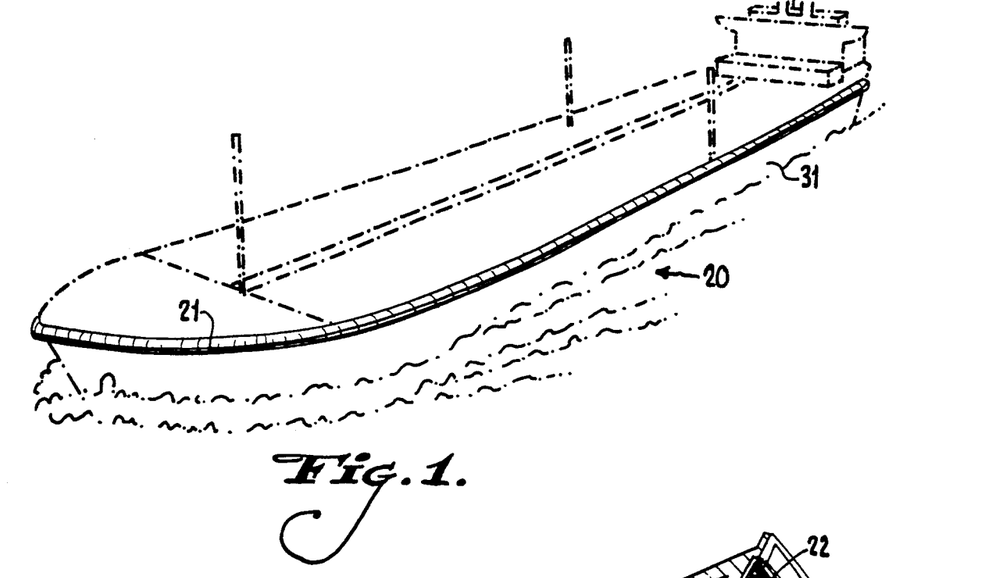
FIG. 1 is a perspective view of a tanker having an undeployed device in place.

In FIG. 1, oil tanker 20 is shown in perspective view. The containment device 21 of the invention is shown affixed to tanker 20 about the upper and outer section of hull 3!.

Figure 2:
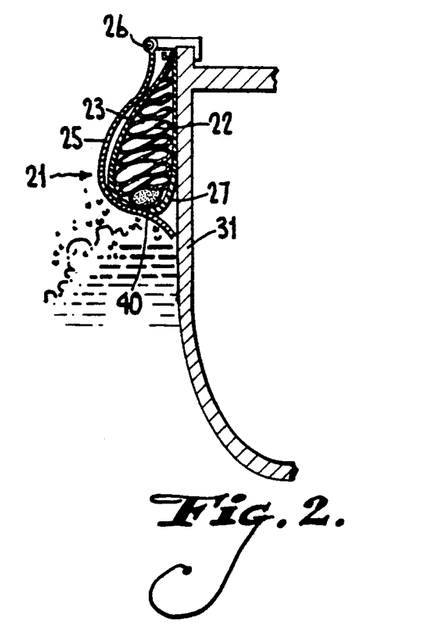
FIG. 2 is a cross-section of the device and the pouch cover.
Figure 3:
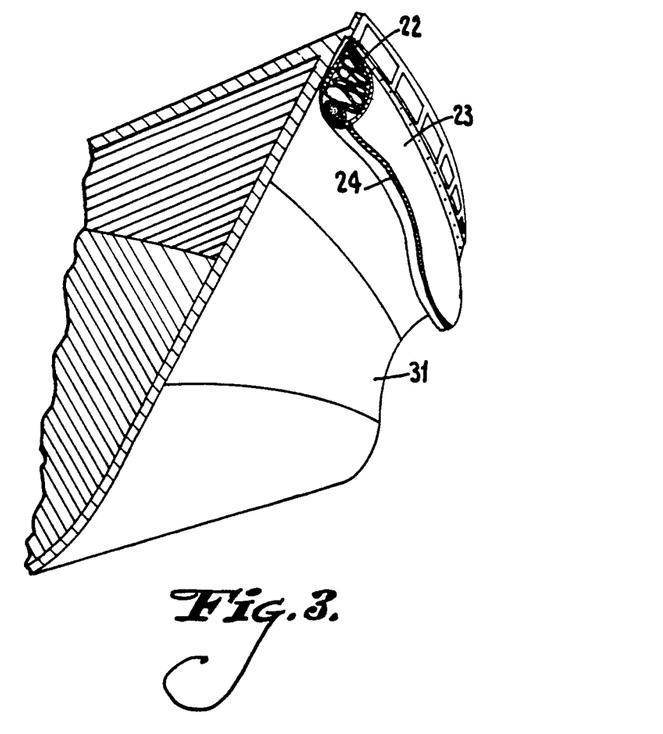
FIG. 3 is a partial perspective view from underneath the device showing a portion of the releasable zipper.

As shown in FIGS. 2 and 3, containment device 21, as stowed, has a folded, flexible skirt held within storage pouch 23. Folded flexible skirt 22 is constructed of, for example, a durable fluid impervious material such as reinforced plastic sheeting. Skirt 22 is weighted at its free edge, for instance having one or more purse formations 40 containing a loose granular material such as sand 27. Alternately, weighted objects such as lead weights could be affixed at spaced points along the free edge of skirt 22. Storage pouch 23 is preferably constructed of a durable heavy rubberized fabric. Storage pouch 23 and flexible skirt 22 preferably continuously encircle the hull 31 of oil tanker 20 without interruption.

A closure device such as zipper 24 can hold pouch 23 closed at its bottom thereby containing skirt 22 as shown in FIG. 3. The zipper is substantially continuous along pouch 23 except for a small discontinuity (not shown in FIGS. 2 and 3) provided to initiate deployment of skirt 22. Deployment will be discussed in more detail hereinafter. Since pouch 23 is attached to the outer part of the hull 31 of oil tanker 20, heavy seas or the like could damage pouch 23 and skirt 22 or cause premature deployment of skirt 22. For this reason, shield 25 preferably is provided. Shield 25 is pivoted along the upper, outer section of the hull of oil tanker 20, for instance, about the rim of the gunwale. Shield 25 is preferably constructed of a number of abutting or overlapping segments of a durable material such as sheet metal, being segmented because a single continuous piece would be unpivotable. It is especially important to provide separate shield segments at places of curvature of the hull. Shield 25 is preformed to bow out to accommodate and protect pouch 23. Shield 25 preferably has a center of gravity disposed outside of the vertical line of pivot 26 whereby gravity tends to hold shield 25 against the hull 31 of tanker 20. Waves or heavy seas striking shield 25 are deflected by shield 25 without impacting and/or harming storage pouch 23. Shield 25 is light enough that skirt 22, and in particular the weighted edge of skirt 22 will pivotally displace shield 25 outwardly upon deployment of skirt 22. In short, shield 25 protects but does not inhibit deployment of skirt 22.

Figures 4, 5, 6, 7:
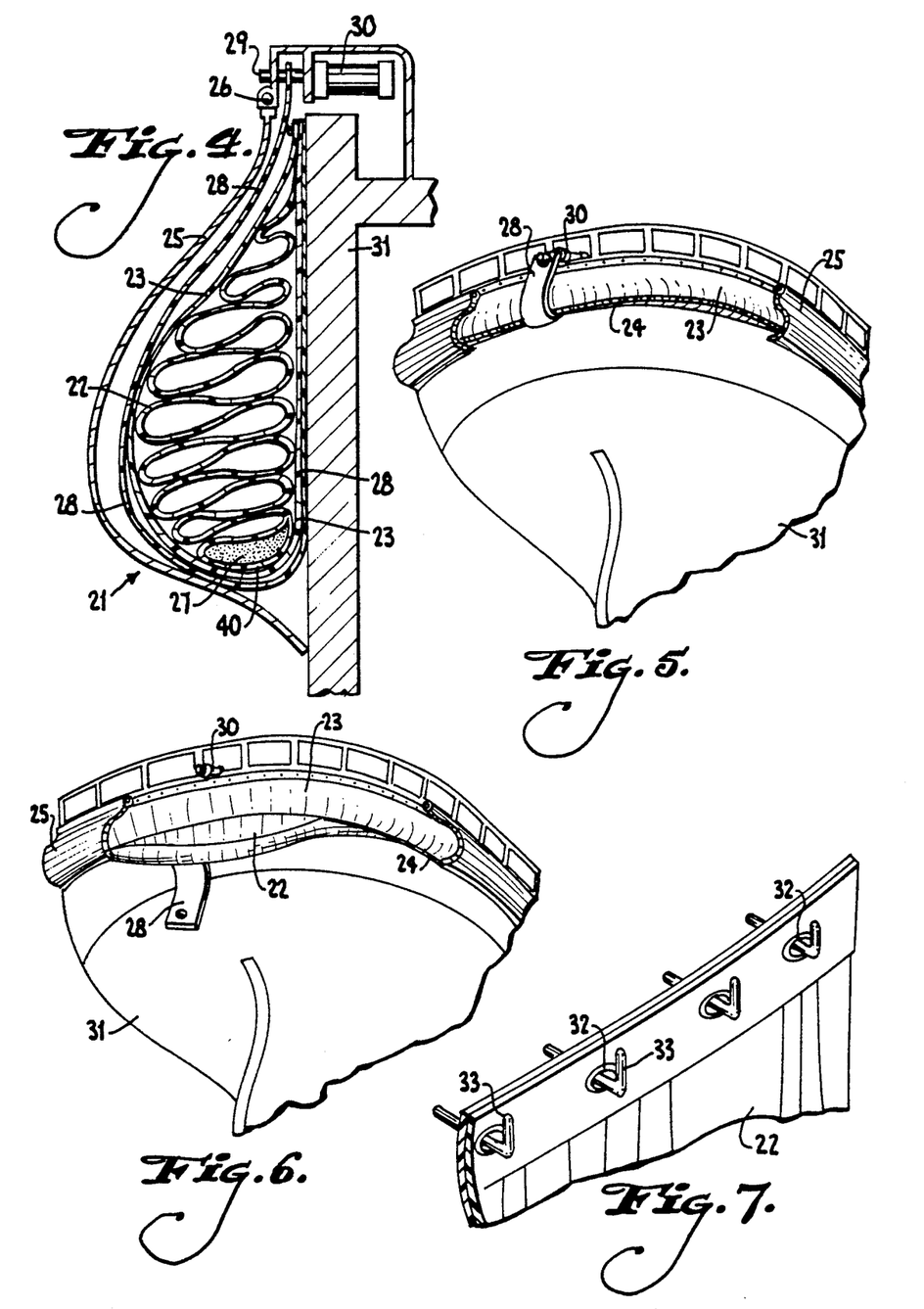
FIG. 4 is an enlarged cross-section of the device and pouch cover.
FIG. 5 is a partial perspective view of the pouch at the stern of a tanker showing the releasable closure strip.
FIG. 6 is a partial perspective view of the pouch at the stern of a tanker shortly after release of the closure strip.
FIG. 7 is a partial perspective view of the top of the pouch showing rings for attaching the pouch to a tanker.

FIGS. 4, 5 and 6 show deployment of skirt 22 from within pouch 23. In FIG. 5, shield 25 is shown cut-away to reveal pouch 23. In FIGS. 4 and 5 a closure strip 28 encircles pouch 23. Closure strip 28 constricts pouch 23 so as to bear the weight of the section of skirt 22 supported by the width of closure strip 28. Zipper 24 has at least one discontinuity which is preferably a gap not larger than 4 inches and defines an end of at least one slider run of the zipper. The discontinuity is located in pouch 23 at the point where pouch 23 is encircled by closure strip 28. Closure strip 28 is a strip of strong, durable fabric or material and has two ends. One end can be affixed to the skirt/pouch combination whereby it is included with the combination as a single unit. Alternately, the strip can have one end affixed directly to the hull. In either instance, the other end of strip 28 has a reinforced hole therethrough. The shaft 29 of a retractable latch mechanism, for instance solenoid 30, passes through this hole to maintain closure strip 28 in a supporting position encircling pouch 23.

In an emergency, shaft 29 of solenoid 30 is retracted. Retraction can be initiated by actuating a switch or preferably any one of a number of switches connected to apply power to solenoid 30. The switches can be located in a number of critical positions on the tanker such as the bridge, the captains quarters, the engine room, the navigational center and the look-out post. In the event of a collision or hull rupture, any of the switches can be actuated for shaft retraction. It is further preferable to provide solenoid 30 with remote control retraction means whereby the captain and important crew members of the ship can, by remote control, retract the solenoid by a suitable control signal initiated from any location on the ship in the event of emergency. It is also possible instead of or in addition to a release mechanism requiring operation of an electrical element, to provide a manual mechanism operable to release closure strip 28.

Upon retraction of solenoid 30, closure strip 28 is released at one end and ceases to provide support for skirt 22. The weight of skirt 22 on the section of pouch 23 having the zipper discontinuity causes zipper 24 to begin disengaging from the point of discontinuity. The zipper continues to disengage under the weight of the skirt all around continuous pouch 23 until the entire pouch has opened and skirt 22 hangs downward from the top of hull 31. This action is shown clearly in FIG. 6. The zipper can have oppositely arranged runners proceeding outwardly from the discontinuity such that the skirt drops free in opposite directions proceeding around the hull. Alternatively, a plurality of zipper runs with corresponding discontinuities, closure strips and solenoids can be provided.

The weight of skirt 22 pushes pivotable shield 25 outward as skirt 22 drops free from pouch 23. Closure strip 28 and accordingly the discontinuity in zipper 24 are shown in FIGS. 5 and 6 to be at the stern of hull 31. This positioning is preferable as this portion of tanker 20 is less prone to be buffeted by heavy seas than for instance the bow or sides of the ship, and is not likely to be interfered with in normal activities such as docking. This arrangement is not limiting as the closure strip 28 and the discontinuity in zipper 24 can be located anywhere about the periphery of hull 31.

Shield 25 can cover closure strip 28 as shown in FIG. 4. However it is possible to leave an opening in shield 25 to ensure that closure strip 28 releases cleanly without the possibility of entanglement or hang-up within shield 25. If shield 25 is to cover closure strip 28, it is wise to provide sufficient room beneath shield 25 to prevent interference with a released closure strip 28.

Containment device 21, as noted above, can be bolted or riveted directly to the exterior of hull 31. Alternately, pouch 23 can have a plurality of reinforced rings 32 as shown in FIG. 7. Hull 31 can be outfitted with hooks 33 whereby pouch 23 containing skirt 22 can be hung on and supported by hooks 33.

Figures 8, 9, 10, 11:
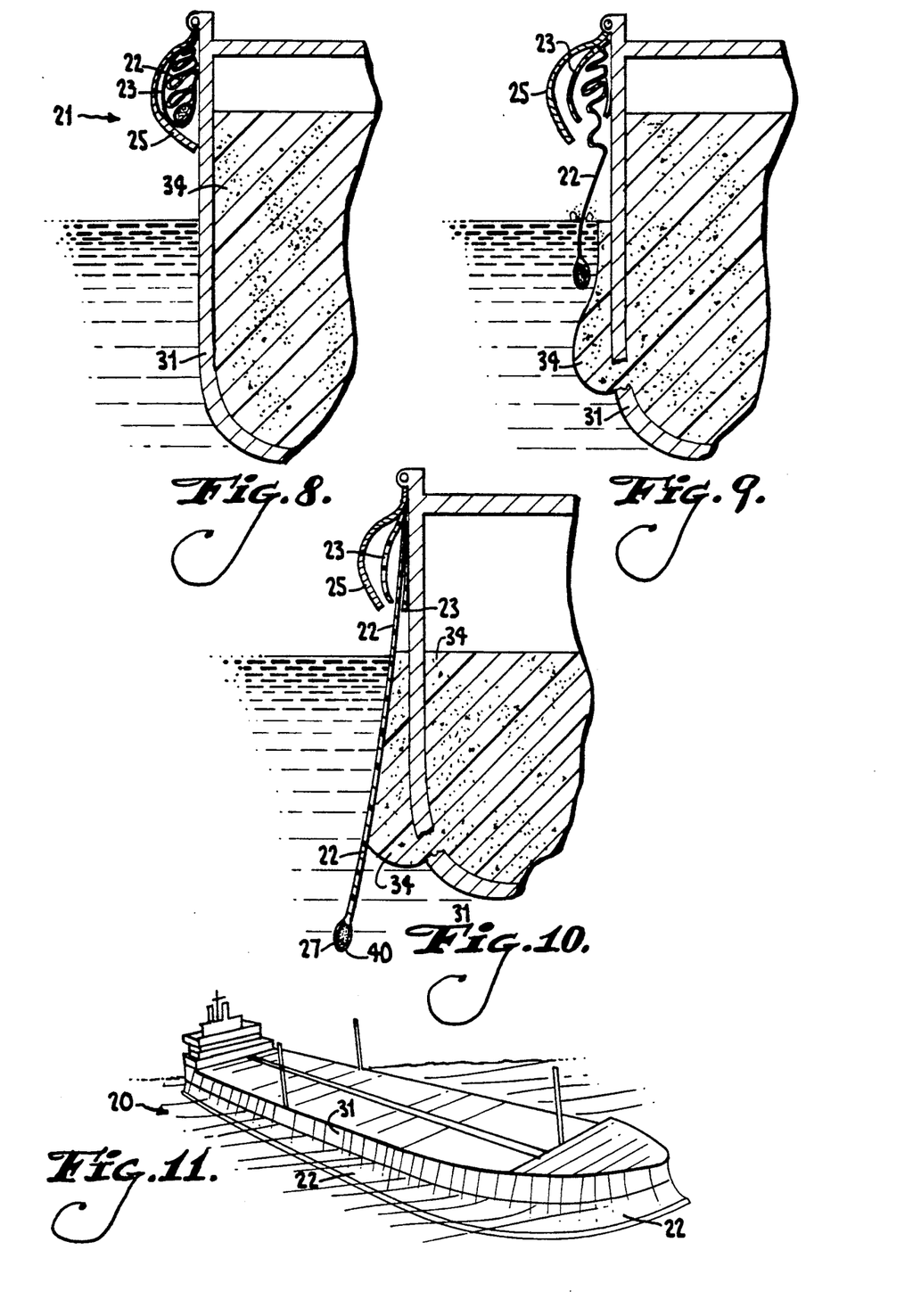
FIG. 8, 9 and 10 are sectional schematics illustrating deployment upon a break in the hull of the tanker.
FIG. 11 is a perspective view of a tanker showing the device fully deployed.

FIGS. 8, 9 and 10 are section views showing deployment of the skirt upon rupturing of the hull. FIG. 8 shows containment device having pouch 23 and skirt 22 protected by shield 25. Hull 31 is filled with a liquid which is less dense than water, such as oil 34.

In FIG. 9, hull 31 has ruptured and oil 34 has begun to flow out of the rupture. The respective solenoid has released the closure strip and pouch 23 has unzippered up to the pertinent point. Skirt 22 has begun to unfurl downward with the weighted edge dropping into the water.

In FIG. 10, sand 27 or the like weighting the bottom edge of skirt 22 causes skirt 22 to fully extend into the water, thereby defining an impervious barrier about hull 31 to contain leaking oil 34 within the span of the skirt. Oil 34 has a lower specific gravity than water and will therefore tend to rise. A sufficiently long skirt is provided to reach at least to the level of the keel, the lowest point of potential leakage, whereby oil will not escape beneath the bottom edges of depending skirt 22. Skirt 22 may flare outwards under the influence of oil accumulating within, and should have a sufficient vertical span to allow for this. Skirt 22 can be made of relatively thin material because the horizontal outward pressure exerted by the pool of oil 34 will be opposed by sea water outside the skirt. A certain percentage of oil 34, being lighter than water, will rise above the surface level of the water but remains trapped by skirt 22. FIG. 11 illustrates tanker 20 having a fully deployed skirt 22.

Figure 12:
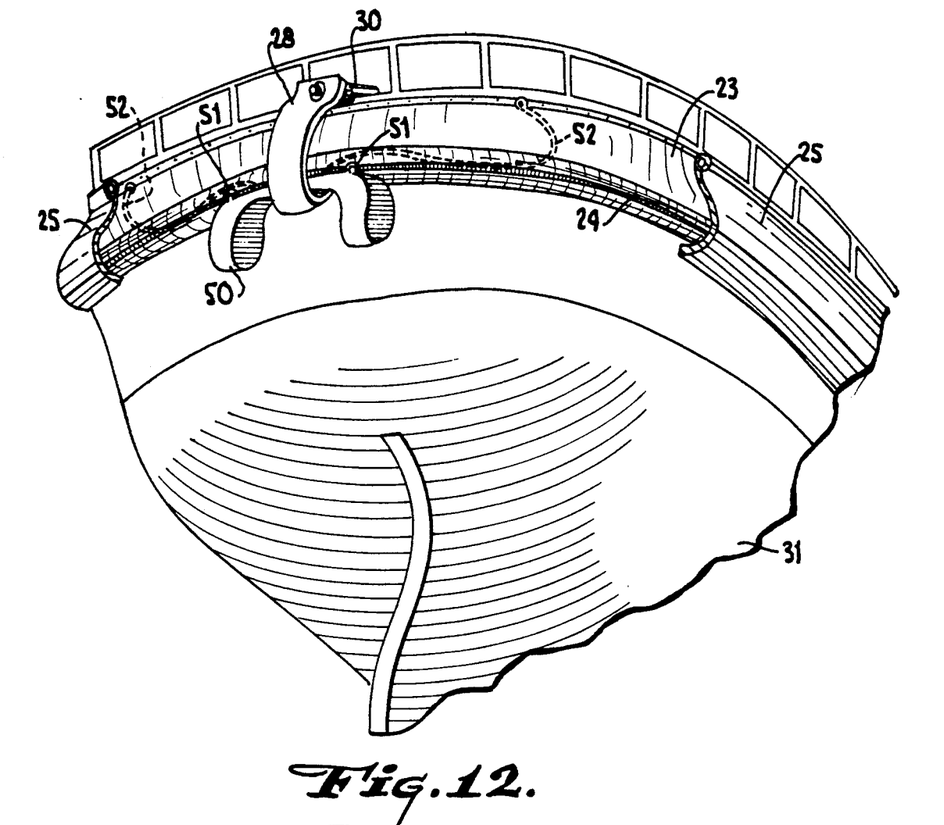
FIG. 12 is a partial perspective view of the pouch at the stern of a tanker showing alternate deployment structure.
Figure 13:
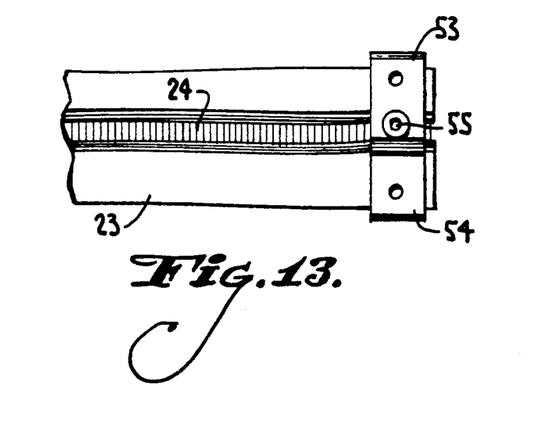
FIG. 13 is a partial bottom view of a zipper end showing retaining strips.

An alternate, more positive means for providing deployment of skirt 22 is depicted in FIGS. 12-15. In FIG. 13, the non-continuous ends of zipper 24 are provided with retainers 53 and 54. Retainer 53 is C-shaped whereby its outermost ends are spaced apart. Retainer 54 has outermost ends which come together whereby they may be inserted within the space defined by the outermost ends of retainer 53. The relationship of retainers 53 and 54 is more fully shown in FIG. 14. Note that although only one end of zipper 24 is depicted in FIG. 13 the identical structure of FIG. 13 is repeated on the on the other side of the zipper end.

Figure 14:
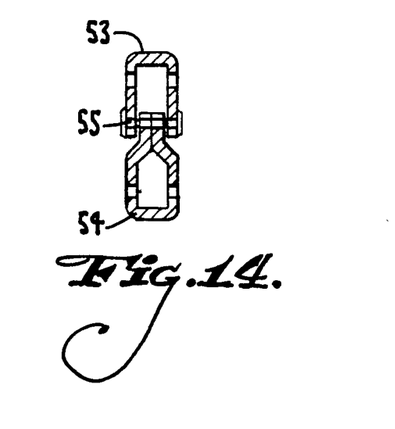
FIG. 14 is a cross-section view of the retaining strips.

Each of retainers 53 and 54 have an aligned hole in their outermost ends so that when in the position shown in FIGS. 13 and 14, aperture 55 is defined.

Referring to FIG. 12, posts 51 of U-shaped weight 50 penetrate apertures 55 defined by retainers 53 and 54. When in place on the stern of hull 31, weight 50 is held in place against skirt 22 and zipper 24 by closure strip 28. Weight 50 has cables 52 attached at its center. Cables 52 enter within pouch 23 at the zipper discontinuity and are affixed at their respective ends at a point within pouch 23, preferably at a location where pouch 23 is affixed to hull 31.

When in place against pouch 23, posts 51 penetrate apertures 55 in retaining strips 53 and 54 to define a lock for preventing premature opening of zipper 24 from the zipper discontinuity.

Figure 15:
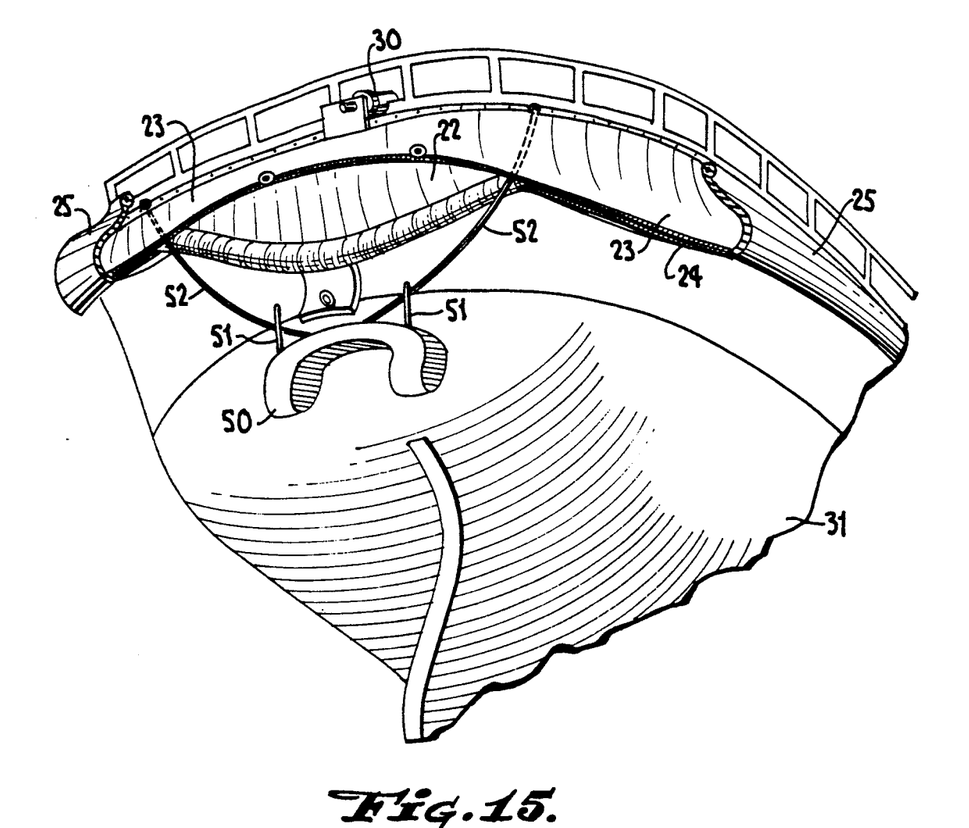
FIG. 15 is a partial perspective view of the pouch at the stern of a tanker shortly after release of the alternatie deployment structure.

As shown in FIG. 15, when closure strip 28 is released by solenoid 30, such as upon a hull rupture, weight 50 drops away from pouch 23 thereby removing posts 51 from apertures 55 to allow zipper 24 to open. Cables 52, fixedly attached at their ends within pouch 23 and to weight 50 are drawn from within pouch 23 by the pull of falling weight 50. Each of cables 52 rips through the interlocking teeth of zipper 24 to open pouch 23 as weight 50 drops. Once zipper 24 begins opening from its discontinuous ends, it will continue opening completely around hull 31 under the force of unfurling skirt 22 until skirt 22 is fully deployed to trap any leaking contaminant. The extent which cables 52 rip through and open zipper 24 depends both on the length of cables 52 and their point of attachment within pouch 23. It is advantageous to provide a sufficient distance between the respective points of attachment of cables 52 within pouch 23 to subject a large section of zipper 24 to the opening effects of cables 52. It is further desirable to limit somewhat the length of cables 52 to prevent excess cable from tangling with skirt 22. When using the alternate deployment means depicted in FIGS. 12-15, shield 25 should not extend to weight 50 to avoid jamming the deployment means.

Generally, if deployed in shallow water or if, for instance, the skirt length exceeds the water depth, the weighted skirt forms an enclosed wall with the sea bottom within which the oil is confined. Nevertheless, even in deep water the skirt keeps the oil confined at the surface.

Relief vessels summoned to the stricken vessel can pump the trapped oil out from beneath skirt 22 into other tankers. Containment device 21 can then be removed from tanker 20. Once in port containment device 21 can be cleaned, refurbished and reattached to the repaired tanker.

Although a number of advantageous embodiments of the invention have been shown and described, various additional forms and embodiments are possible within the scope of the invention claimed. For instance, the skirt can be constructed of a variety of materials consistent with its objects of durability, fluid imperviousness and flexibility. Likewise, the pouch can be made from any type of strong, durable and weather resistant material. The skirt can be removable from the interior of the pouch by, for example, an interior zipper whereby the pouch can be permanently affixed to the vessel while the pouch is removable for cleaning or replacement. The deployment mechanism can be an air cylinder, solenoid or other releasable closure. It is preferable to provide a deployment mechanism having manual retraction means to manually retract the cylinder in the event of failure of the automatic retraction means.

Further modification of the device within the scope of the invention will also be apparent to those skilled in the art in view of this disclosure. Accordingly, reference should be made to the appended claims rather than the foregoing specification in assessing the scope of the invention in which exclusive rights are claimed.

I claim:

1. A spill containment device mountable about the hull of a ship, the hull having a keel, substantially vertical walls with outer, uppermost section, and a height defined by a vertical distance between the keel and a top of the vertical walls, the device comprising:

a storage pouch having an interior and an exterior, mounted to the outer uppermost hull section, said pouch including releasable closure means;

a continuous flexible skirt attached at a first skirt edge to said interior of said pouch and having a opposing free skirt edge, the distance therebetween defining a vertical span, said skirt being sized to completely encircle the hull, and when stowed being contained within said storage pouch; and, deployment means operable to release said closure means, thereby permitting said opposing free skirt edge to drop from within said storage pouch, said continuous flexible skirt thereby depending from said outer, uppermost section, preventing spread of any released contaminants to the surrounding water.

2. The spill containment device of claim 1 wherein said opposing free skirt edge is weighted.

3. The spill containment device of claim 1 wherein the skirt span at least substantially equals the hull height.

4. An spill containment device as recited in claim 1 wherein the releasable closure means comprises a band of interlocking teeth around a bottom of said pouch.

5. An oil spill containment device as recited in claim 4 wherein said teeth are non-continuous around a bottom of said pouch thereby defining at least one tooth discontinuity, said teeth being held in an interlocking state by a releasable closure strip encircling said pouch at said discontinuity whereby when said closure strip is released, said interlocking teeth separate starting at said discontinuity under the weight of the skirt.

6. The spill containment device as recited in claim 5 wherein said closure strip is held in position encircling said pouch by an electromagnetically retractable shaft, retraction of said shaft releasing said closure strip.

7. The spill containment device as recited in claim 5 wherein said closure strip is held in position encircling said pouch by a retractable air cylinder, retraction of said cylinder releasing said closure strip.

8. The spill containment device of claim 6 wherein said retractable shaft can be retracted via remote control.

9. The spill containment device as recited in claim 1 further comprising a shield extending outwardly from said hull at a point above said pouch and downwardly over said pouch, thereby forming a protective barrier for said pouch.

10. The spill containment device of claim 9 wherein said shield substantially completely encloses said pouch, said shield being pivotally attached to said hull, said shield pivoting outward from said hull upon deployment of said skirt.

11. The spill containment device of claim 1 wherein the skirt span is greater than the hull height.

12. The spill containment device of claim 6 wherein said shaft includes manual retraction means.

13. The spill containment device of claim 7 wherein said shaft includes manual retraction means.

14. In combination, a ship and spill containment device therefor, said ship comprising a hull, said hull having a keel, substantially vertical walls with outer, uppermost sections, and a height defined by the vertical distance between the keel and a top of the vertical walls, said spill containment device having a storage pouch having an interior and an exterior mounted to the outer uppermost hull section, said pouch including releasable closure means, a continuous flexible skirt attached at a first skirt edge to said interior of said pouch and having an opposing free skirt edge, the distance therebetween defining a vertical span, said skirt being sized to completely encircle the hull, and when stowed being contained within said storage pouch and deployment means operable to release said closure means, thereby permitting said opposing free skirt edge to drop from within said storage pouch, whereby said continuous flexible skirt depends from said outer, uppermost section and surrounds the hull of the ship, preventing spread of any released contaminants to the surrounding water.

15. A spill containment device mountable about the hull of a ship, the hull having a keel, substantially vertical walls with outer, uppermost sections, and height defined by the vertical distance between the keel and a top of the vertical walls, comprising:

a storage pouch having an interior and an exterior mounted to the outer uppermost hull section, said pouch including a band of interlocking teeth around a bottom of said pouch defining releasable closure means;

a continuous flexible skirt attached at a first skirt edge to said interior of said pouch and having an opposing free skirt edge, the distance therebetween defining a vertical span, said skirt being sized to completely encircle the hull, and when stowed being contained within said storage pouch; and, deployment means operable to release said closure means, thereby permitting said skirt to drop from within said storage pouch and surround the hull of the ship, preventing spread of any released contaminants to the surrounding water.

16. An oil spill containment device as recited in claim 15 wherein said teeth are non-continuous around a bottom of said pouch thereby defining at least one tooth discontinuity, said teeth being held in an interlocking state by a releasable closure strip encircling said pouch at said discontinuity whereby when said closure strip is released, said interlocking teeth separate starting at said discontinuity under the weight of the skirt.

17. The spill containment device as recited in claim 16 wherein said closure strip is held in position encircling said pouch by an electromagnetically retractable shaft, retraction of said shaft releasing said closure strip.

18. The spill containment device as recited in claim 16 wherein said closure strip is held in position encircling said pouch by a retractable air cylinder, retraction of said cylinder releasing said closure strip.

19. The spill containment device of claim 17 wherein said retractable shaft can be retracted via remote control.

20. The spill containment device of claim 17 wherein said shaft includes manual retraction means.

21. The spill containment device of claim 18 wherein said shaft includes manual retraction means.

* * * * *